United States Patent
Peterson (10) Patent No.: US 10,909,255 B2
(45) Date of Patent: Feb. 2, 2021

(54) SYSTEMS AND METHODS TO CONTROL DATA ACCESS AND USAGE

(71) Applicant: DATA REPUBLIC PTY LTD, Sydney (AU)

(72) Inventor: Ryan Matthew Peterson, Discovery Bay, CA (US)

(73) Assignee: DATA REPUBLIC PTY LTD, Sydney (AU)

( * ) Notice: Subject to any disclaimer, the term of this patent is extended or adjusted under 35 U.S.C. 154(b) by 453 days.

(21) Appl. No.: 15/685,305

(22) Filed: Aug. 24, 2017

(65) Prior Publication Data

US 2019/0065765 A1 Feb. 28, 2019

(51) Int. Cl.
*G06F 21/62* (2013.01)
*H04L 29/06* (2006.01)
*G06F 16/25* (2019.01)

(52) U.S. Cl.
CPC .......... *G06F 21/6218* (2013.01); *G06F 16/25* (2019.01); *H04L 63/105* (2013.01); *G06F 2221/2141* (2013.01); *H04L 63/101* (2013.01)

(58) Field of Classification Search
CPC ........ G06F 21/6218; G06F 16/25; G06F 8/63; G06F 8/61; G06F 8/71; G06F 21/57; H04L 63/105–108
See application file for complete search history.

(56) References Cited

U.S. PATENT DOCUMENTS

| | | | | |
|---|---|---|---|---|
| 5,347,579 A | * | 9/1994 | Blandford | G06F 21/34 713/176 |
| 5,752,068 A | * | 5/1998 | Gilbert | G06F 15/17337 710/22 |
| 6,643,362 B2 | * | 11/2003 | Hogan | H04M 3/4228 379/114.14 |
| 7,305,582 B1 | * | 12/2007 | Moser | G06F 9/526 714/11 |
| 2005/0044551 A1 | * | 2/2005 | Sodhi | G06F 9/546 719/312 |
| 2006/0184673 A1 | * | 8/2006 | Liebman | G11B 27/034 709/225 |
| 2007/0198838 A1 | * | 8/2007 | Nonaka | H04L 9/3236 713/176 |
| 2010/0103106 A1 | * | 4/2010 | Chui | G09B 21/00 345/166 |

(Continued)

*Primary Examiner* — Ali S Abyaneh
*Assistant Examiner* — Shu Chun Gao
(74) *Attorney, Agent, or Firm* — Greenberg Traurig (57) ABSTRACT

Systems and methods to control data access and usage by storing a permitted use of a set of data items. The permitted use identifies: a set of computer resources to be used to operate on the set of data items; rules for operating on the data items; and a data product to be generated from the set of computer resources operating on the set of data items. A project space provides the set of computer resources to operate on the set of data items according to the permitted use, wherein the data product is to be transferred from the project space to a user device separate from the system; and a usage monitor records operations of the set of computer resources on the set of data items in the project space for compliance with the permitted use. A data air-lock mechanism implements dynamic permissions rules based on actual usages.

20 Claims, 5 Drawing Sheets

(56) References Cited

U.S. PATENT DOCUMENTS

| | | | |
|---|---|---|---|
| 2010/0175104 A1* | 7/2010 | Khalid | G06F 21/53 726/1 |
| 2011/0145593 A1* | 6/2011 | Auradkar | G06F 21/6218 713/189 |
| 2014/0032759 A1* | 1/2014 | Barton | H04L 67/10 709/225 |
| 2015/0310228 A1* | 10/2015 | Benz | G16B 45/00 726/26 |
| 2015/0370540 A1* | 12/2015 | Coslovi | G06Q 10/06 717/121 |
| 2016/0285835 A1* | 9/2016 | Linga | G06F 16/93 |
| 2016/0381036 A1* | 12/2016 | Goldsack | H04L 63/105 726/4 |
| 2018/0027006 A1* | 1/2018 | Zimmermann | H04L 63/0245 726/11 |
| 2019/0340377 A1* | 11/2019 | Yuan | H04L 63/102 |

* cited by examiner

SYSTEMS AND METHODS TO CONTROL DATA ACCESS AND USAGE

FIELD OF THE TECHNOLOGY

At least some embodiments disclosed herein relate to data storage and retrieval in general and more particularly but not limited to access control of stored and/or streamed data.

BACKGROUND

There is a plethora of information that is collected by organizations and subsequently transferred to other organizations. When one company is to share data with another company, they consider a series of legal, regulatory, and ethical boundaries and set authorization of data use.

Historically, authorization of data use has been thought about as an enterprise problem. Traditional governance solutions allowed permissions to be bound to a particular agent of that organization to be used for whatever uses that agent felt necessary. Breaches of use were handled as an internal matter of the enterprise. However, in the new data economy where sellers and buyers of data are emerging, the agent using the data may not be beholden to policies of the company.

Some techniques related to data governance have been developed. For example, U.S. Pat. App. Pub. No. 2016/0306827 discloses a system to implement data governance through synchronizing data rules and corresponding metadata. U.S. Pat. App. Pub. No. 2014/0250537 discloses a data governance and licensing system for monitoring usage of tracking data associated with transport of a plurality of packages and for facilitating licensing arrangements in connection therewith. U.S. Pat. App. Pub. No. 2017/0091279 discloses a system for data owners to expose data and users to gain access to data within their enterprise while maintaining data governance policies required by the data owner. U.S. Pat. App. Pub. No. 2016/0092818 discloses an adaptive data governance system having a data governance workflow that references a hierarchy.

The entire disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the past, data has been shared between entities without respect for the sensitivity of the uses of that data. As privacy and other regulatory concerns reach an alarming level, the inventions disclosed herein provide new techniques of governing the specific uses of data to manage the risk associated with data sharing.

Previous systems generally stopped at providing to users permission otherwise known as authorization, but failed to link the permitted use to a specific project, a specific workspace, a specific computer or set of computers, a specific application or set of applications for the processing of the data, and/or a specific output or set of outputs generated from the processing of the data, etc.

At least some embodiments disclosed herein provide a data sharing platform that controls data access according to documented permitted uses. The platform not just sets the permissions of a user, but to assign limitations to the use of data outside of a project workspace, a computer(s) to process the data, an application(s) to operate on the data, a specific processing function(s) of the application(s) to be applied on the data, and/or the generation of a specific output or set of outputs from the application(s) that can be retained by the user for the permitted uses.

Preferably, Personally Identifiable Information (PII) in each data set is replaced with tokens that do not reveal the identities of the persons involved in the data set, before the data set is stored and/or shared on the data sharing platform.

One technique to use tokens to protect Personally Identifiable Information (PII) in data storage is provided in U.S. patent application Ser. No. 15/078,804, filed Mar. 23, 2016 and entitled "Systems and Methods to Protect Sensitive Information in Data Exchange and Aggregation", the entire disclosure of which is hereby incorporated herein by reference.

For example, the data sharing platform of the present application can be implemented in the data exchange described in U.S. patent application Ser. No. 15/078,804 in aggregating and sharing the data items from various data sources.

The data sharing platform disclosed herein implements governance of permitted uses of data items. A receiver of a set of data items for use is to particularly identify a permitted use that is documented via metadata elements attached to the data items. For example, the permitted use metadata elements may identify why the data item is used (e.g., to solve a particular problem in a particular project and thus limit the permission of data access, granted by the permitted use, only to the particular project), what data output is to be generated from the use, when the permitted use is to occur (e.g., a time period of the permitted use), where the permitted use is to take place (e.g., a project, a computer system, an application running for a project), and how the data is to be used (e.g., format of permitted use), etc.

After the approval of the permitted use that is initially identified by the receiver of the data item (e.g., approved in accordance with the terms and conditions specified by the data owner, and/or in compliance with the requirements of applicable laws and regulations), the data sharing platform performs data use surveillance to enforce the limits of the data access specified in the permitted use, records/logs the data use sessions on the platform (e.g., accessed via a virtual machine on the platform), and/or proves compliance with the permitted use from auditing and/or playing back the recorded sessions.

For example, after performing tokenization to secure Personally Identifiable Information (PII) (e.g., using the technique of U.S. patent application Ser. No. 15/078,804), the data items can be shared with a receiver/user via the platform disclosed herein. The platform attaches metadata elements to the data items to define attributes of the data (e.g., steward/owner/administrator, update frequency, etc.). After a potential user of the data items defines a specific use case, the platform allows the data steward to grant specific access to the data items for the specific purpose defined in the use case. In response to the use case being approved, the platform tags the data items with attributes that allow the data to be used within a specific silo (e.g., in a particular work space/virtual machine hosted on the platform, for processing by one or more particular applications to generate one or more particular output items) and by a specific set of personnel. According to the use case, the platform allows the data to be used but only within a specific computer system (e.g., a virtual machine), or a set of systems (e.g., a set of virtual machines, or a dedicated, secured and monitored set of computers). The platform prevents access to the data within other systems (e.g., other virtual machines) that the user might also have access to. The platform audits and surveils the permitted computer system(s) such that the user is compelled to remain within the permitted use of the original request. The platform allows the data product as approved by the use case to be exported out of the platform and transmitted/delivered to the user device (e.g., as approved by the original data steward/owner/administrator) but prevents other data items to be exported and disseminated.

Thus, the data sharing platform performs governance of permitted use of data for secure data exchange between one or more organizations in a secure and authorized manner.

The data sharing platform optionally includes interfaces for receiving metadata about a particular data set, storing metadata in a database. A token key may exist in a data set to represent a piece of Personally Identifiable Information (PII), "Personal Information" (PI), or "Sensitive Personal Information" (SPI).

The data sharing platform typically includes a computer system (e.g., implemented as virtual machine) that is used for a project workspace. When the particular data set is shared for a permitted use in the project workspace, the usage of the data set is limited to be within the project workspace according to the use parameters identified in the permitted use. The permitted use may include the export of pre-identified data products generated from the use of the data set in the project workspace. Only the permitted export may leave the project workspace (e.g., transmitted to a permitted user device of the data set); and any other data loaded into and/or generated in the project workspace is prevented from leaving the project workspace to the user device. The permitted use may limit the functions of applications that can be applied to the shared data items (e.g., print, display, file transfer, combination, statistical process).

A data governance model may include at least some of the following criteria/metadata and perhaps more:

Data Availability, Decision Rights, Search and Filter, Collaboration and Communication, Data Cataloging, Issue Resolution, Application use of data, Steward-support, Financial Requirements, Permitted Use, Metadata Visibility, Terms of Use, Change Management, Legal Permission, High Value Rare Data Availability, Ethics Validation, Data Export Management, Data, Data Architecture, Data Security and Auditing, Data Definition, User Permissions, Data Quality Enforcement, Permission Granularity, Data Workflow, Tag-based Access Control, Documented Security Protocols, Data DMZ, Data DMZ Surveillance, Measurement/Reporting, Data Piracy Detection, Licensing, Audit Records, Data Licensure, Data Collection and Use Lineage, Data Update Frequency, Visual Audit Controls, Policy and Terms Enforcement, Stakeholder Feedback, Regulatory Management/Enforcement, PII Detection and Removal, Compliance with International Regulations, etc.

Figure 1:
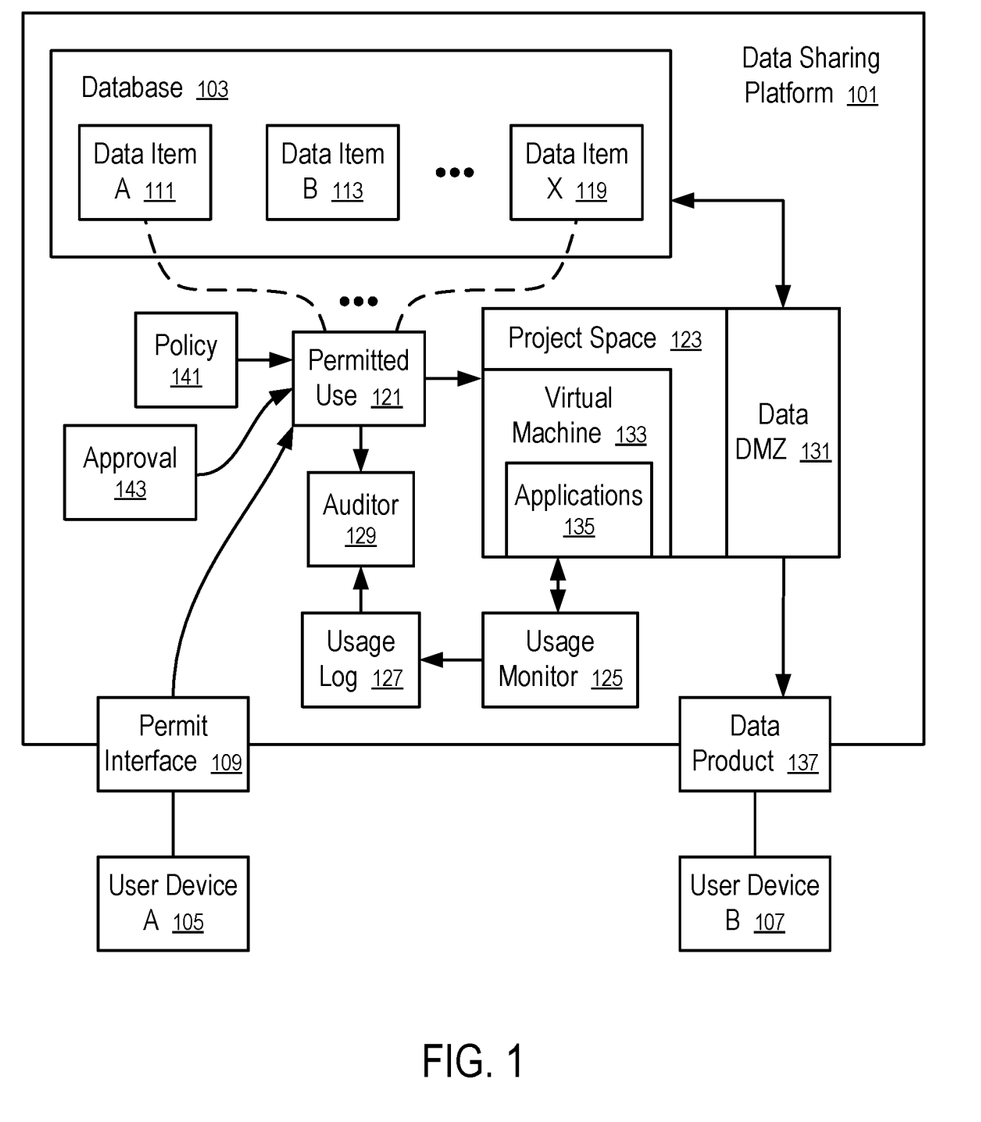
FIG. 1 shows a data sharing platform with access and usage control according to one embodiment.

FIG. 1 shows a data sharing platform with access and usage control according to one embodiment.

In FIG. 1, the data sharing platform (101) includes a database (103) (or a repository of files, data streams, as well as structured database style elements) storing a set of data items (111, 113, . . . , 119). The data items (111, 113, . . . , 119) may be collected from different sources and/or owned by different entities. The data items (111, 113, . . . , 119) may include tokens that represent the PII (e.g., in a way as discussed in U.S. patent application Ser. No. 15/078,804). In some instances, portions of the data items (111, 113, . . . , 119) may reside in different repositories, databases, and/or different computer systems that are connected via a computer network and aggregated for a specific permitted use (121) (e.g., by a data exchange described in U.S. patent application Ser. No. 15/078,804).

In FIG. 1, the data sharing platform (101) includes a permit interface (109) to receive the specification of the permitted use (121) from a user device (105). The permitted use (121) specifies what data items (111, 113, . . . , 119) are used for, in what ways the data items (111, 113, . . . , 119) are used, what data products (137) will be generated from the permitted use.

In FIG. 1, the permitted use (121) identifies not only the user devices (e.g., 107) that are allowed to use the data items (111, 113, . . . , 119) (e.g., by the way of the authentication credentials of the user devices (e.g., 107) and/or the authentication credentials of the permitted users of the user devices (e.g., 107), but also various aspects of the run-time use of the data items (111, 113, . . . , 119) by specific applications (135) operating on the data items (111, 113, . . . , 119).

After the permitted use (121) is requested via the permit interface (109), the permitted use (121) is checked against a data usage policy (141) (e.g., as specified by its owner/steward, and/or required by applicable rules and laws). If the permitted use (121) is in compliance with the usage policy (141), an approval (143) is provided in the data sharing platform (101) to allow the application of the permitted use (121) to a project space (123).

FIG. 1 illustrates a project space (123) that represents a set of computer resources for the permitted use (121) of the data items (111, 113, . . . , 119). In general, the data sharing platform (101) may have multiple project spaces (e.g., 123) for different projects; and some users and/or user devices (e.g., 105, 107) may be granted access to one or more project spaces (e.g., 123). Different permitted uses (e.g., 121) may have different project spaces (123); and the permissions of the permitted use (121) are granted only for its associated project space (123). The project space (123) represents a permitted use location of the data items (111, 113, . . . , 119) involved in the permitted use (121); and the permission of the permitted use (121) is only granted to the data use in the project space(s) (e.g., 123) specified in the permitted use (121).

The computer resources of the project space (123) typically include a particular computer system that is implemented as a virtual machine (133) hosted on the data sharing platform (101). However, the particular computer system can also be provisioned as a set of dedicated computer hardware for the project (e.g., for the duration of the project associated with the permitted use (121)).

The computer resources of the project space (123) may further include a set of one or more applications (135) configured in the particular computer system (e.g., the virtual machine (133)) to operate on the data items (111, 113, . . . , 119). The applications (135) may be used to inspect the data items (111, 113, . . . , 119), perform statistical analyses of the data items (111, 113, . . . , 119), generate data products (137) according to predefined functions, algorithms, and/or processes, etc.

In some instances, the applications (135) in the project space (123) are specifically configured for the project according to the permitted uses (121). For example, allowed functions of the applications (135) are configured in the virtual machine (133) while other functions of the applications (135) are disabled according to the permitted use (121) such that the capability and/or functionality of the project space (123) is consistent with the generation of the data product (137) specified in the permitted use (121).

In FIG. 1, the project space (123) includes a data DMZ (demilitarized zone) (131) that controls data flow into and out of the project space (123) via a data transfer interface and/or a visual presentation interface (e.g., a graphical user interface, or a text based user interface). The data DMZ (131) enforces the permissions specified in the permitted use (121).

For example, the data DMZ (131) allows the applications (135) to access a selected subset of data items (111, 113, . . . , 119) under the conditions specified in the permitted use (121) and prevents the applications (135) to access other portions of the data items (111, 113, . . . , 119). For example, the data DMZ (131) allows the data products (137) identified in the permitted use (121) to leave the project space (123) and be communicated to the user device (107) but prevents other data from leaving the project space (123).

In some instances, the data DMZ (131) dynamically adjusts the permissions for accessing the data items (111, 113, . . . , 119) based on the actual use patterns in the project space (123) for compliance with the permitted use (121). For example, a permitted use (121) may allow the access to the data items (111 and 113) one at a time, but not at the same time, in the project space (123) and/or across multiple project spaces. In some instances, the permitted use (121) allows the same user device (107) and/or a same user (who may be operating multiple devices concurrently) to access the data items (111 and 113) one at a time, but not at the same time in the project space (123) and/or across multiple project spaces.

In FIG. 1, the data sharing platform (101) includes a usage monitor (125) that communicates with the applications (135) and/or the data DMZ (131) to monitor the data usage in the project space (123) and generate the usage log (127).

In some implementations, the usage log (127) may optionally include the identifications of data products (137) that are generated in the project space (123) as the outputs of the applications (135) using the data items (111, 113, . . . , 119) and communicated from the project space (123) to the user device (107) that accesses the project space (123) to use the data items (111, 113, . . . , 119). The identifications of the data products (137) facilitated the monitoring and auditing of the use of the data items (111, 113, . . . , 119).

In some implementations, the usage log (127) includes the identification of the functions of the applications (135) applied to the data items (111, 113, . . . , 119) such that the session of the data use in the project space (123) can be played back to determine what has been provided to the user device (107) in the use session in the project space (128).

In FIG. 1, the data sharing platform (101) includes an auditor (129) that may check and/or play back the use session for auditing, detecting suspicious activities that may violate the restrictions of the permitted use (121), and generating alerts upon detection of the suspicious activities.

In some instances, the auditor (129) adjusts the operations of the data DMZ (131) to enforce the conditions of the permitted use (121).

In some implementations, data enters and/or leaves the project space (123) via the data DMZ (131); and the usages of the data in the data DMZ (131) correspond to the state of the data in the data DMZ (131). Thus, the usage monitor (125) may simply monitor the states of the data in the data DMZ (131) to surveil any data activity in ensuring compliance with the rules of the permitted use (121). For example, when a data item (111) is closed in the data DMZ (131), the data item (111) is purged from the virtual machine (133). The authorized user device (107) is connected to the project space (123) via the data DMZ (131) and receives the data project (137) from the project space (123) through the data DMZ (131).

Figure 2:
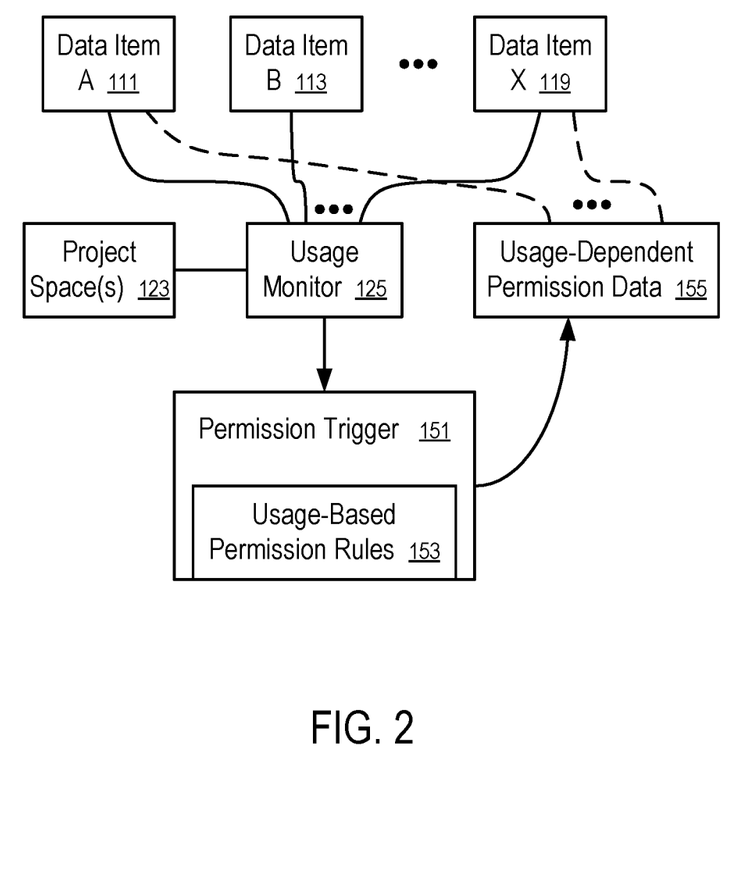
FIG. 2 shows a dynamic permission system that can be used in the data sharing platform of FIG. 1.

FIG. 2 shows a dynamic permission system that can be used in the data sharing platform of FIG. 1.

The system of FIG. 2 can be used to implement a data air-lock mechanism that dynamically adjusts permissions to access a subset of data items (111, 113, . . . , 119) in response to current access operations on another subset of data items (111, 113, . . . , 119).

For example, the permitted use (121) may include a rule that allows the use of the data items (111, 113) one at a time, but not simultaneously. When the data item (111) is being accessed in a project space (123), from a user device (107), and/or by a same user who is being authenticated to use the data sharing platform (101), the data air-lock mechanism generates permission data (155) to prevent access to the data item (113) in the same project space (123), from the same user device (107) and/or by the same user. In some instances, a change in the permission to access one or more data items is trigged by the use of a combination of data items.

The system illustrated in FIG. 2 includes a usage monitor (125) that monitors the run-time usage of the data items (111, 113, . . . , 119) in one or more project spaces (123). The usage monitor (125) provides current information identifying the current usage of the data items (111, 113, . . . , 119) in the project space(s) (123) to a permission trigger (151). The permission trigger (151) has a set of usage-based permission rules (153). Each of the set of rules (153) identifies a data item (111, 113, . . . , or 119) (or a combination of data items) and one or more permission changes for accessing other data items in response to a usage status change of the data item (111, 113, . . . , or 119) (or the combination of data items).

For example, in response to data item A (111) being used, one of the usage-based permission rules (153) causes the permission trigger (151) to generate or change usage-dependent permission data (155) that changes the permission status of access to data item B (113) from "permitted" to "not-permitted" to prevent simultaneous access to both data item A (111) and data item B (113). In response to data item A (111) not being used, one of the usage-based permission rules (153) causes the permission trigger (151) to generate or changes usage-dependent permission data (155) that changes the permission status of access to data item B (113) from "not-permitted" to "permitted" to allow subsequent access to either data item A (111) or data item B (113). The usage-dependent permission data (155) can thus be used as a data air-lock that allows the access to data items A and B (111 and 113) one at a time, but not simultaneously.

In some implementations, the usage-based permission rules (153) also include rules to update, add, or delete rules to the usage-based permission rules (153) based on the usage information provided by the usage monitor (125) to implement specific data air-lock mechanisms.

The air-lock mechanisms allow the permitted use (121) to be situationally based, where the authorization or permission to access a portion of the data items (111, 113, . . . , 119) are based on a specific scenario of a combination of access to a subset of the data items (111, 113, . . . , 119). Thus, the authorization or permission dynamically changes in response to the actual use of the data items (111, 113, . . . , 119).

For example, a data air-lock can be used to allow the access of the data item (111) in two separate project spaces one at a time, but not simultaneously, For example, a data air-lock can be used to allow the access of the data item (111) from two separate user devices one at a time, but not simultaneously, For example, a data air-lock can be used to allow the access of the data item (111) by two separate users one at a time, but not simultaneously, For example, a data air-lock can be used to allow the access of the data item (111) via two separate sets of authentication credentials in one or more projects one at a time, but not simultaneously, Preferably, the data air-lock mechanism can be implemented at various granularity of data items (111, 113, . . . , 119), such as the granularities of file, database, table, row, column, cell. Further, the data items (111, 113, . . . , 119) don't have to be at the same granularity level. For example, data item A (111) may be a file, database, or table, while data item B (113) may be a row, column, or cell of a table. The use of a file, database, table, etc. triggers permission changes to other files, databases, tables, rows, columns, etc.

Figure 3:
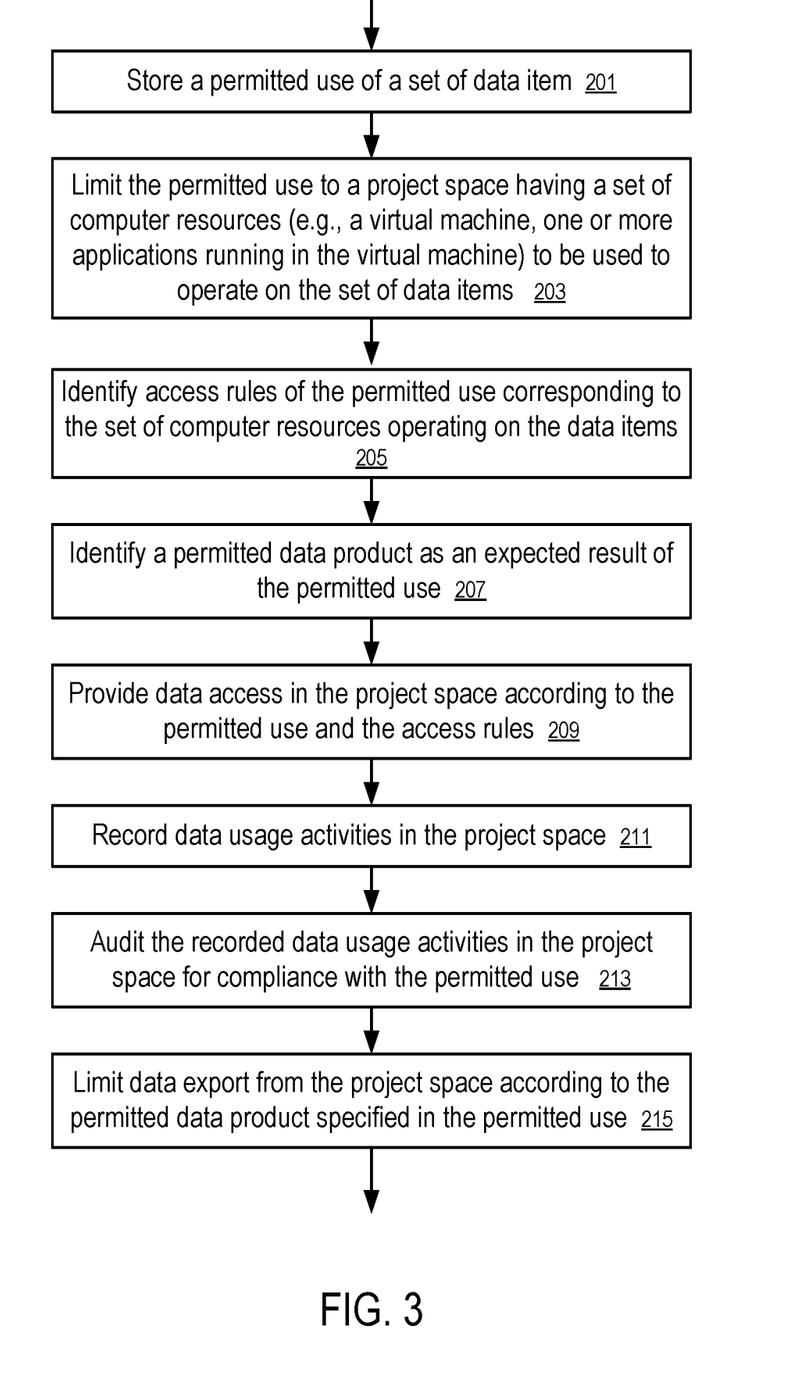
FIG. 3 shows a method to control access to and usage of data according to one embodiment.

FIG. 3 shows a method to control access to and usage of data according to one embodiment.

For example, the method of FIG. 3 can be implemented in the data sharing platform (101) discussed above.

In FIG. 3, a computing apparatus, such as the data sharing platform (101) of FIG. 1, stores (201) a permitted use (121) of a set of data item (111, 113, . . . , 119) and limits (203) the permitted use (121) to a project space (123) having a specific set of computer resources (e.g., a virtual machine (133), one or more applications (135) running in the virtual machine (135)), wherein the computer resources are to be used to operate on the set of data items (111, 113, . . . , 119).

The permitted use (121) as stored in the computing apparatus identifies (205) access rules of the permitted use (121) corresponding to the set of computer resources operating on the data items (111, 113, . . . , 119).

The permitted use (121) as stored in the computing apparatus further identifies (207) a permitted data (137) product as an expected result of the permitted use (121) and the expected result of permitted operations performed by the computer resources on the data items (111, 113, . . . , 119).

The computing apparatus provides (209) data access in the project space (123) according to the permitted use (121) and its access rules. The permissions provided by the permitted use (121) are limited within the project space (123), which may include the execution of the applications (135) within a predetermined period of time and/or in one or more sessions of execution.

The computing apparatus records (211) (e.g., using the usage monitor (125)) data usage activities in the project space (123) and audits (213) (e.g., using the auditor (129)) the recorded data usage activities in the project space (123) for compliance with the defined permitted use (121).

The computing apparatus limits (215) (e.g., via the data DMZ (131)) data export from the project space (123) (e.g., to the user device (107)) according to the permitted data product (137) specified in the permitted use (121).

In some instances, the permitted use (121) is specified at least in part by a requester (e.g., via the permit interface (109) from a user device (105), which may or may not be the same as the user device (107) that is permitted to access the project space (123)).

Figure 4:
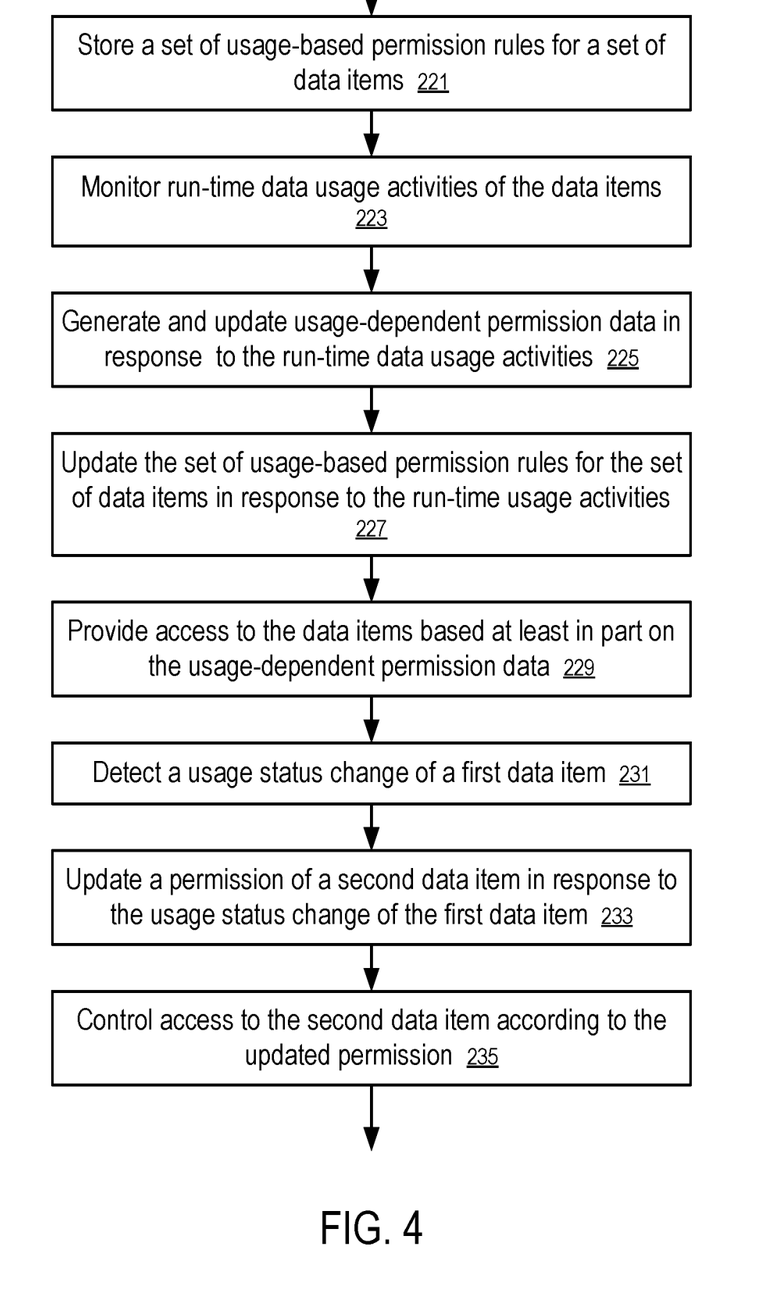
FIG. 4 shows a method to control usage-based data access permit according to one embodiment.

FIG. 4 shows a method to control usage-based data access permit according to one embodiment.

For example, the method of FIG. 4 can be implemented using a system illustrated in FIG. 2 to implement a data air-lock mechanism in the data sharing platform (101) of FIG. 1.

In FIG. 4, a permission trigger (151) stores (221) a set of usage-based permission rules 9153) for a set of data items (111, 113, . . . , 119). A usage monitor (125) coupled with the permission trigger (151) monitors (223) run-time data usage activities of the data items (111, 113, . . . , 119) the data sharing platform (101). The usage-based permission rules (153) may be dependent on the usage activities at the run-time of the applications (135) in one project space (123) or in multiple related project spaces (e.g., project spaces accessed from the same user device (107) concurrently, and/or accessed by one or more related users from one or more user devices (107) concurrently).

The permission trigger (151) generates and updates (225) usage-dependent permission data (155) in response to the run-time data usage activities and optionally updates (227) the set of usage-based permission rules (153) for the set of data items (111, 113, . . . , 119) in response to the run-time usage activities.

Access to the data items (111, 113, . . . , 119) are provided (229) based at least in part on the usage-dependent permission data (155) that may change dynamically in response to the data usages in one or more project spaces (123).

For example, in response to detecting (231) a usage status change of a first data item (111), the permission trigger (151) updates (233) a permission of a second data item (113) in response to the usage status change of the first data item; and access to the second data item (113) is controlled (235) according to the updated permission.

For example, in response to the first data item (111) being used in a project space (123), access to the second data item (113) is blocked in one or more project spaces (123); in response to the first data item (111) being not used in the project spaces (123), the block of the second data item (113) is removed to allow access to any of the first data item (111) and the second data item (113); and when the second data item (113) is accessed in one of the project space (123), access to the first data item (111) is blocked in the one or more project spaces (123).

Figure 5:
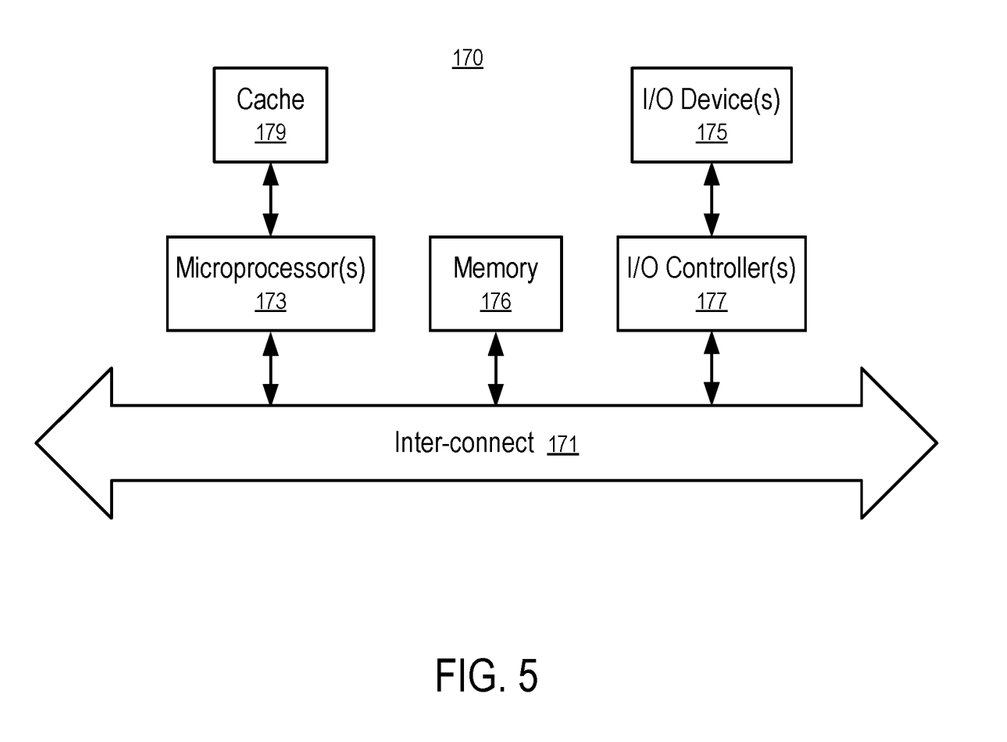
FIG. 5 shows a data processing system that can be used to implement some of the components of the system according to one embodiment.

FIG. 5 shows a data processing system that can be used to implement some of the components of the system according to one embodiment. While FIG. 5 illustrates various components of a computer system, it is not intended to limit the implementations to any particular architecture or manner of interconnecting the components. One embodiment may use other systems that have fewer or more components than those shown in FIG. 5.

For example, the data sharing platform (101) illustrated in FIG. 1 can be implemented using one or more data processing systems illustrated in FIG. 5, with fewer or more components than those shown in FIG. 5.

For example, each user device (105 or 107) illustrated in FIG. 1 can be implemented using one or more data processing systems illustrated in FIG. 5, with fewer or more components than those shown in FIG. 5.

For example, the database (103) illustrated in FIG. 1 can be implemented using one or more data processing systems illustrated in FIG. 5, with fewer or more components than those shown in FIG. 5.

For example, the auditor (129) illustrated in FIG. 1 can be implemented using one or more data processing systems illustrated in FIG. 5, with fewer or more components than those shown in FIG. 5.

For example, the data monitor (125) illustrated in FIG. 1 can be implemented using one or more data processing systems illustrated in FIG. 5, with fewer or more components than those shown in FIG. 5.

For example, the project space (123) and/or the virtual machine (133) illustrated in FIG. 1 can be implemented using one or more data processing systems illustrated in FIG. 5, with fewer or more components than those shown in FIG. 5.

For example, the permit interface (109) illustrated in FIG. 1 can be implemented using one or more data processing systems illustrated in FIG. 5, with fewer or more components than those shown in FIG. 5.

For example, the permission trigger (151) illustrated in FIG. 2 can be implemented using one or more data processing systems illustrated in FIG. 5, with fewer or more components than those shown in FIG. 5.

In FIG. 5, the data processing system (170) includes an inter-connect (171) (e.g., bus and system core logic), which interconnects a microprocessor(s) (173) and memory (176). The microprocessor (173) is coupled to cache memory (179) in the example of FIG. 5.

In one embodiment, the inter-connect (171) interconnects the microprocessor(s) (173) and the memory (176) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (176) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
    memory storing a permitted use of a set of data items, the permitted use identifying:
        a set of computer resources to be used to operate on the set of data items;
        rules specified for the set of data items, the rules for operating on the set of data items upon accessing the set of data items; and
        a data product to be generated from the set of computer resources operating on the set of data items, wherein a first function of the set of computer resources is configured to generate the data product specified in the permitted use and wherein a second function of the set of computer resources is disabled according to the permitted use;
    a project space providing the set of computer resources to operate on the set of data items according to the permitted use, wherein the data product is to be transferred from the project space to a user device separate from the system; and
    a usage monitor recording operations of the set of computer resources on the set of data items in the project space for compliance with the permitted use.

2. The system of claim 1, wherein the project space enforces the rules for operating on the set of data items.

3. The system of claim 2, wherein the set of computer resources further includes one or more applications configured to run in a virtual machine to perform the operations.

4. The system of claim 3, wherein the set of computer resources includes the virtual machine allocated for the project space.

5. The system of claim 3, wherein the project space prevents simultaneous access to two of the data items according to the permitted use.

6. The system of claim 3, wherein the system prevents simultaneous access to two of the data items in two project spaces both authorized to access the two of the data items according to respective permitted uses associated with the two project spaces respectively.

7. The system of claim 3, wherein the system prevents simultaneous access to two of the data items via two sets of credentials.

8. The system of claim 3, wherein the system prevents simultaneous access to two of the data items via two sets of credentials both authorized for the permitted use.

9. The system of claim 3, wherein the system prevents simultaneous access to two of the data items from two different user devices both authorized for the permitted use.

10. The system of claim 3, wherein the set of computer resources further includes a data demilitarized zone (DMZ) that controls data in and out of the project space via a data interface or a visual interface.

11. The system of claim 10, further comprising:
an auditor that receives a usage log from the usage monitor identifying usages of the set of data items in the project space and detects a violation of the permitted use from the usage log.

12. The system of claim 11, further comprising:
a permission trigger coupled with the usage monitor to implement a data air-lock over two of the data items.

13. A method, comprising:
storing a permitted use of a set of data items, the permitted use identifying:
- a set of computer resources to be used to operate on the set of data items;
- rules specified for the set of data items, the rules for operating on the set of data items upon accessing the set of data items; and
- a data product to be generated from the set of computer resources operating on the set of data items, wherein the generation of the data product to be generated is specified in the permitted use and wherein a function of the set of computer resources is disabled according to the permitted use;

providing a project space having the set of computer resources to operate on the set of data items according to the permitted use, wherein the data product is to be transferred from the project space to a user device separate from a system that provides the project space; and recording, using a usage monitor coupled with the project space, operations of the set of computer resources on the set of data items in the project space for compliance with the permitted use.

14. The method of claim 13, wherein the set of computer resources includes:
a computer system allocated for the project space;
one or more applications running in a virtual machine to perform the operations; and
a data DMZ that controls data in and out of the project space.

15. The method of claim 14, wherein the data DMZ allows only the data product identified in the permitted use to leave the project space in a way specified in the permitted use.

16. The method of claim 15, wherein the way to leave the project space is one of: display, print, file transfer, data stream, database connection, or data transfer protocol.

17. The method of claim 15, wherein permissions provided in the permitted use is limited to the operations in the project space.

18. The method of claim 17, wherein the permissions are dependent on usage status of the set of data items.

19. The method of claim 16, further comprising:
generating usage-dependent permission data according to the recording of the usage monitor to enforce usage-based permission rules of the permitted use.

20. A non-transitory computer storage medium storing instructions which when executed on a computing apparatus, cause the computing apparatus to perform a method, the method comprising:
storing a permitted use of a set of data items, the permitted use identifying:
- a set of computer resources to be used to operate on the set of data items;
- rules specified for the set of data items, the rules for operating on the set of data items upon accessing the set of data items; and
- a data product to be generated from the set of computer resources operating on the set of data items, wherein the generation of the data product to be generated is specified in the permitted use and wherein a function of the set of computer resources is disabled according to the permitted use;

providing a project space having the set of computer resources to operate on the set of data items according to the permitted use, wherein the data product is to be transferred from the project space to a user device separate from a system that provides the project space; and recording, using a usage monitor coupled with the project space, operations of the set of computer resources on the set of data items in the project space for compliance with the permitted use.

* * * * *